US012181930B2

(12) United States Patent
Atom et al.

(10) Patent No.: US 12,181,930 B2
(45) Date of Patent: Dec. 31, 2024

(54) ACCESSORY DEVICES FOR ELECTRONIC DEVICES

(71) Applicant: Apple Inc., Cupertino, CA (US)

(72) Inventors: Kristine S. Atom, Santa Clara, CA (US); Charles A. Bates, III, Felton, CA (US); Taylor Harrison Gilbert, Los Gatos, CA (US); Eric Shyr, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 18/085,448

(22) Filed: Dec. 20, 2022

(65) Prior Publication Data

US 2023/0119798 A1    Apr. 20, 2023

Related U.S. Application Data

(63) Continuation of application No. 17/093,407, filed on Nov. 9, 2020, now Pat. No. 11,561,586.
(Continued)

(51) Int. Cl.
*G06F 1/16* (2006.01)

(52) U.S. Cl.
CPC .......... *G06F 1/1669* (2013.01); *G06F 1/1616* (2013.01)

(58) Field of Classification Search
CPC .... G06F 1/1632; G06F 1/1669; G06F 1/1616; G06F 1/1656; G06F 1/1677
See application file for complete search history.

(56) References Cited

U.S. PATENT DOCUMENTS 8,599,542 B1    12/2013   Healey
8,900,009 B2    12/2014   Hornick et al.
(Continued)

FOREIGN PATENT DOCUMENTS

CN    104871111 A    8/2015
CN    104956287 A    9/2015
(Continued)

OTHER PUBLICATIONS

Chinese Office Action from Chinese Patent Application No. 202110250065.1, dated Jun. 20, 2024, 32 pages including machine-generated English language translation.
(Continued)

*Primary Examiner* — James Wu
(74) *Attorney, Agent, or Firm* — BAKERHOSTETLER

(57) ABSTRACT

An accessory device with a cover and keyboard section is described. The keyboard section includes a keyboard and a touchpad, while the cover section includes multiple segments. The cover section orients the electronic device such that a user can access the electronic device, the keyboard, and the touchpad. The cover section is rotationally coupled to the keyboard section by one or more hinge assemblies (including clutches and springs), allowing the cover section and the electronic device to rotate relative to the keyboard section. The cover section includes a first and second segment rotationally coupled together. To further adjust the electronic device, the first segment remains coupled to the electronic device, allowing the first segment and the electronic device to rotate relative to the second segment. The cover section can then suspend the electronic device over the keyboard section, and the electronic device does not contact the keyboard section.

20 Claims, 12 Drawing Sheets

Related U.S. Application Data

(60) Provisional application No. 62/987,321, filed on Mar. 9, 2020.

(56) References Cited

U.S. PATENT DOCUMENTS

| | | | |
|---|---|---|---|
| 9,228,696 | B2 | 1/2016 | Borloz et al. |
| 9,416,912 | B2 | 8/2016 | Grziwok et al. |
| 10,671,121 | B2 * | 6/2020 | Zhu .................. G06F 1/1637 |
| 11,048,304 | B2 * | 6/2021 | Kang ..................... H04B 5/48 |
| 2007/0097613 | A1 | 5/2007 | Tracy |
| 2011/0170252 | A1 | 7/2011 | Bradley et al. |
| 2012/0068798 | A1 | 3/2012 | Lauder et al. |
| 2014/0104761 | A1 | 4/2014 | Hsu |
| 2014/0285960 | A1 | 9/2014 | Sharma et al. |
| 2015/0022442 | A1 | 1/2015 | Hwang et al. |
| 2016/0056592 | A1 | 2/2016 | Sharma |
| 2016/0062413 | A1 | 3/2016 | Sano et al. |
| 2017/0060180 | A1 | 3/2017 | Griffin et al. |
| 2018/0107253 | A1 | 4/2018 | Landwehr |
| 2018/0116354 | A1 | 5/2018 | Fernando et al. |

FOREIGN PATENT DOCUMENTS

| | | |
|---|---|---|
| CN | 105278617 A | 1/2016 |
| CN | 106878496 A | 6/2017 |
| CN | 110168470 A | 8/2019 |
| CN | 209980127 U | 1/2020 |
| JP | 2006-065739 A | 3/2006 |
| JP | 2012-113762 | 6/2012 |
| JP | 2013-025420 A | 2/2013 |
| JP | 3182771 U | 4/2013 |
| JP | 2014-209301 A | 11/2014 |
| JP | 2016-110554 A | 6/2016 |
| JP | 2017-152043 | 8/2017 |
| JP | 2018-136643 | 8/2018 |
| JP | 2019-019970 | 2/2019 |
| KR | 101173820 | 8/2012 |
| KR | 200466178 | 4/2013 |
| KR | 1020180014212 | 2/2018 |
| WO | WO 2013/135645 | 9/2013 |
| WO | WO 2014/084818 | 6/2014 |
| WO | WO 2017/040093 | 3/2017 |
| WO | WO 2018/138787 | 8/2018 |

OTHER PUBLICATIONS

Korean Notice of Allowance from Korean Patent Application No. 10-2023-0013676, dated Jun. 26, 2024, 6 pages including machine-generated English language translation.

Japanese Notice of Allowance from Japanese Patent Application No. 2021-008927, dated Jan. 27, 2023, 5 pages including machine-generated English language translation.

Korean Notice of Allowance from Korean Patent Application No. 10-2021-0027228, dated Nov. 28, 2022, 8 paged including machine-generated English language translation.

B&H Photo Video, "CTA Digital Laptop and Tablet Dual Gooseneck Clam Stand," https://www.bhphotovideo.com/c/product/1332780-REG/cta_ditigal_pad_dit_heavy_duty_dual_gooseneck_clamp.html; 4 pages, retrieved on Sep. 7, 2020.

Indian Office Action from Indian Patent Application No. 202114005350, dated Jan. 11, 2022.

Japanese Office Action from Japanese Patent Application No. 2021-008927, dated Apr. 4, 2022.

Korean Office Action from Korean Patent Application No. 10-2021-0027228, dated Jan. 21, 2022.

Korean Office Action from Korean Patent Application No. 10-2021-0027228, dated Jul. 26, 2022, 11 pages including English language translation.

Korean Office Action from Korean Patent Application No. 10-2023-0013676, dated Oct. 17, 2023, 5 pages including English language translation.

Japanese Office Action from Japanese Patent Application No. 2023-026330, dated Mar. 22, 2024, 6 pages including English language translation.

Japanese Notice of Allowance from Japanese Patent Application No. 2023-026330, dated Aug. 19, 2024, 5 pages including machine-generated English language translation.

* cited by examiner

ACCESSORY DEVICES FOR ELECTRONIC DEVICES

CROSS-REFERENCE TO RELATED APPLICATIONS

The present application is a continuation of U.S. patent application Ser. No. 17/093,407, entitled "ACCESSORY DEVICES FOR ELECTRONIC DEVICES," filed Nov. 9, 2020, which claims the benefit of U.S. Provisional Application No. 62/987,321, entitled "ACCESSORY DEVICES FOR ELECTRONIC DEVICES," filed Mar. 9, 2020, the contents of which are incorporated herein by reference in its entirety for all purposes.

FIELD

The following description relates to accessory devices for electronic devices. In particular, the following description relates to accessory devices with multiple sections, including a cover section and keyboard section, that are movable/rotatable with respect to each other. The cover section is able to support an electronic device by holding and suspending the electronic device in a manner such that the electronic device is not in contact with the keyboard section.

BACKGROUND

Accessory devices are used for electronic devices. Some accessory devices include a keyboard used to communicate with an electronic device. Traditional accessory devices can support the electronic device in an upright manner and provide a support surface or channel/trough to receive the electronic device.

SUMMARY

In one aspect, an accessory device is described. The accessory device may include a first section comprising an input mechanism configured to provide an input to the electronic device. The accessory device may further include a first cylindrical member coupled with the first section. The first cylindrical member may include an opening. The accessory device may further include a second section that defines a receiving surface for the electronic device. The accessory device may further include a second cylindrical member coupled with the second section, the second cylindrical member located in the opening. In some exemplary embodiments, the second section is configured to rotate relative to the first section based on rotation of the second cylindrical member relative to the first cylindrical member.

In another aspect, an accessory device is described. The accessory device may include a first section comprising a first input mechanism and a second input mechanism. The first input mechanism and the second input mechanism may be configured to provide inputs to the electronic device. The accessory device may further include a port carried by the first section. The accessory device may further include a second section rotationally coupled to the first section. The second section may include electrical contacts electrically coupled to the port by a wire. The second section may further include a first segment. The second section may further include a second segment. In some exemplary embodiments, the first segment is rotationally coupled to the second segment. The second section may further include a first hinge coupled to the first segment and the second segment. The first hinge may be configured to limit rotation of the first segment relative to the second segment. The second section may further include a second hinge coupled to the first segment and the second segment, the second hinge defining a conduit. In some exemplary embodiments, the wire passes through the conduit and is routed through the first segment and the second segment.

In another aspect, an accessory device is described. The accessory device may include a first section that includes an input mechanism configured to provide an input to the electronic device. The accessory device may further include a second section that defines a receiving surface for the electronic device. The second section may include a first segment. The second section may further include a second segment rotationally coupled to the first segment by i) a first hinge that limits rotation of the first segment relative to the second segment, and ii) a second hinge that includes frictional elements. In some exemplary embodiments, the first segment remains in a fixed position relative to the second segment based upon frictional engagement between the frictional elements. The accessory device may further include a spring mechanism coupled with the first section. The accessory device may further include a clutch mechanism coupled with the second section and the spring mechanism.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
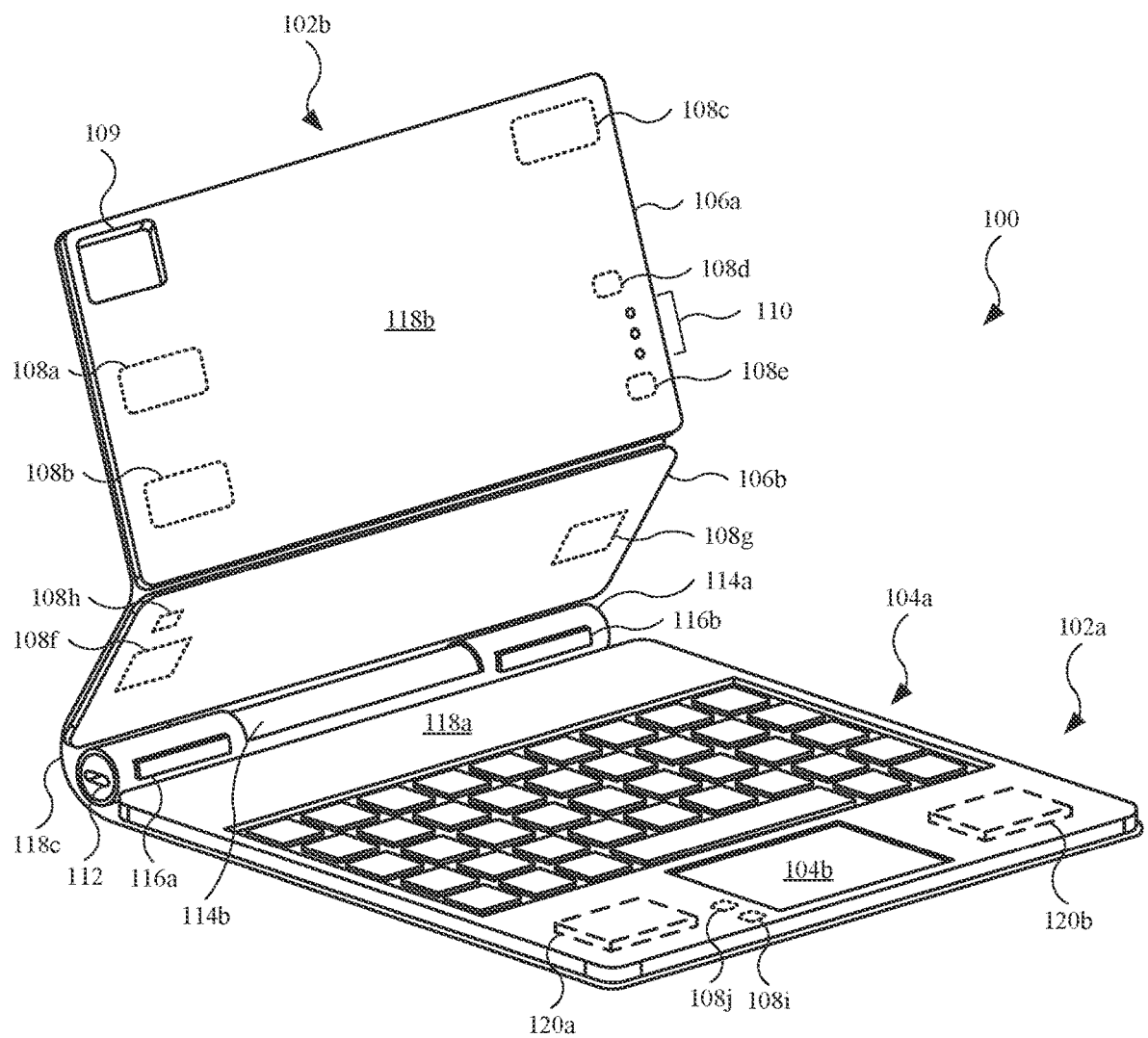
FIG. 1 illustrates an isometric view of an accessory device, in accordance with some described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to accessory devices suitable for use with electronic devices, such as mobile wireless communication devices (e.g., smartphones and tablet computing devices). In addition to providing a protective cover, accessory devices described herein can support and orient the electronic device, and make the electronic device accessible by a user. Accessory devices described herein may include multiple sections, such as a first section (or cover section) and a second section (or keyboard/input section) rotationally coupled together by one or more hinge assemblies. The first section includes several segments, at least some of which include a magnet designed to magnetically couple with magnets in the electronic device. The second section includes input mechanisms (e.g., keyboard, track pad) that allow the user to interact with the electronic device. Unlike traditional accessory devices, accessory devices described herein can hold/suspend an electronic device, allowing the electronic device to "float" or hover a section of the electronic device. For example, using the hinge assemblies, the segments of first section can hold and suspend the electronic device over the second section without the electronic device contacting the second section, thereby allowing the user to view the electronic device and interact with the input mechanisms to control the electronic device.

The hinge assemblies provide sufficient frictional forces that enable the first section to remain in a fixed position, while holding and suspending the electronic device against gravitational forces. This feature of the accessory device provides several advantages. For instance, the keyboard and the electronic device remain sufficiently spaced apart, thereby increasing the flexibility of the design/layout of the electronic device relative to the keyboard, or vice versa. Moreover, based on the "floating" characteristic of the electronic device, the accessory device can position the electronic device at least partially over the keyboard while still allowing the user to interact with the keys positioned under the electronic device. Further, to prevent over-rotation and tipping over of the electronic device, the hinge assemblies can incorporate integrated stop mechanisms that limit movement of the sections, and in turn the electronic device.

Hinge assemblies of accessory devices described herein may provide additional functions. For instance, in addition to limiting movement of the segments and providing frictional forces that enable the segments to hold the electronic device in a fixed position (against gravity), some hinge assemblies may provide a pathway for wiring that is routed through the segments. In this regard, accessory devices described herein may include electrical contacts designed to establish communication between the electronic device and the accessory device. Additionally, accessory devices described herein may include a port to receive a connector from an external power source. Using the electrical contacts, accessory devices described herein can relay electrical energy from the external power source to the electronic device and charge a battery (or batteries) of the electronic device.

These and other embodiments are discussed below with reference to FIGS. 1-16. However, those skilled in the art will readily appreciate that the detailed description given herein with respect to these Figures is for explanatory purposes only and should not be construed as limiting.

FIG. 1 illustrates an isometric view of an accessory device 100, in accordance with some described embodiments. Accessory device 100 may be referred to as a cover, a protective cover, or a folio, as non-limiting examples. As shown, accessory device 100 includes a section 102a and a section 102b. Section 102b is designed for relative movement (i.e., rotation) with respect to section 102a, and vice versa. Sections 102a and 102b may be referred to as a first section and a second section, respectively. However, "first" and "second" may be used interchangeably. Further, sections 102a and 102b may be referred to as a keyboard section and a cover section, respectively. Section 102a may include an input mechanism 104a and an input mechanism 104b. As shown, input mechanism 104a includes a keyboard and input mechanism 104b includes a track pad, or touch pad.

Section 102b may include multiple segments. For example, section 102b includes a segment 106a and a segment 106b. Segment 106a is designed for relative movement (i.e., rotation) with respect to segment 106b, and vice versa. Segments 106a and 106b may be referred to as a first segment and a second segment, respectively. However, "first" and "second" may be used interchangeably.

Section 102b may include several magnets embedded in segments 106a and 106b. For example, section 102b includes magnets 108a, magnets 108b, magnets 108c, magnets 108d, and magnets 108e located in segment 106a.

Section 102b further includes magnets 108f, magnets 108g, and a magnet 108h located in segment 106b. Additionally, section 102a includes magnets 108i and a magnet 108j. It should be noted that each of the aforementioned magnets are represented by a rectangular perimeter. However, in some instances, the rectangular perimeter represents several discrete magnetic elements. At least some of the aforementioned magnets are designed to magnetically couple with magnets in an electronic device (not shown in FIG. 1). In this manner, accessory device 100 can retain/secure the electronic device to section 102b. Moreover, the magnets located in segment 106a may provide a magnetic field sufficient enough to retain/secure the electronic device and suspend the electronic device over section 102a, even when accounting for the weight of the electronic device and gravitational effects. Also, at least some of the aforementioned magnets provide a magnetic field detectable by a sensor of an electronic device, with the detection used as logic to determine a relationship between accessory device 100 and the electronic device. This will be further discussed below.

Also, section 102b may include an opening 109, or through hole, formed in segment 106a. In this manner, an electronic device that includes a camera assembly and/or a flash module that is/are not covered by section 102b when the electronic device is secured with section 102b. While opening 109 is shown in a particular location on segment 106a, opening 109 may be located anywhere on segment 106a corresponding to location of the camera assembly and the flash module on the electronic device.

Accessory device 100 may further include electrical contacts 110 located on segment 106a. In this regard, when an electronic device is secured with the section 102b, accessory device 100 may form a communication channel with the electronic device using electrical contacts 110. As a result, a user can use input mechanism 104a to provide inputs or commands to the electronic device in the form of keystrokes, and the user can use input mechanism 104b to provide inputs to the electronic device in the form of gestures and/or depressing (i.e., clicking) input mechanism 104b. While electrical contacts 110 are shown in a particular location on segment 106a, electrical contacts 110 may be located anywhere on the segment 106a corresponding to location of the electrical contacts on the electronic device. Also, while electrical contacts 110 show three electrical contacts, the electrical contacts 110 may vary in other embodiments. In particular, electrical contacts 110 may include a number of contacts corresponding to the number of electrical contacts located on an electronic device.

Accessory device 100 may further include a port 112. Port 112 may include a cavity, or recess, designed to receive a cable connector (not shown in FIG. 1) connected to an external power source. Port 112 may be designed for an industry standard, such as Universal Serial Bus ("USB") or USB-C, as non-limiting examples. However, other industrial standards are possible. Further, port 112 is in electrical communication with the electrical contacts 110 through cables or flexible circuitry (not sown in FIG. 1). As a result, accessory device 100 can receive electrical energy through port 112 and provide the electrical energy to an electronic device that is in electrical communication with electrical contacts 110. The electrical energy can be used to charge a battery, or batteries, of the electronic device. Also, while port 112 is described as a means for supplying energy to the electronic device, in some embodiments, port 112 is also used for two-way data transmission between the electronic device and an external data source (not shown in FIG. 1), such as a computing device or data server. Accordingly, in some embodiments, port 112 is used for two-way data transmission between accessory device 100 and the aforementioned external data source. Further, it should be noted that accessory device 100 delivers direct current ("DC") through electrical contacts 110. In this regard, accessory device 100 does not supply relatively high voltage or high current through electrical contacts 110, and thus electrical contacts 110 are safe for human contact.

In order to promote relative rotational movement between sections 102a and 102b, accessory device 100 may include multiple cylindrical members. For instance, accessory device 100 includes a cylindrical member 114a coupled with section 102a, and a cylindrical member 114b coupled with section 102b. Each of cylindrical members 114a and 114b may define a tube, or shaft, that is generally hollow, thereby providing a conduit for other components. In this regard, accessory device 100 may integrate hinge assemblies (including clutch mechanisms and spring mechanisms) within cylindrical members 114a and 114b. This will be further shown and described below.

Cylindrical members 114a and 114b may include a metal, such as aluminum (including anodized aluminum), as a non-limiting example. Accordingly, cylindrical members 114a and 114b may provide a rigid component that provides protection for accessory device 100 in the event accessory device 100 is dropped and absorbs a significant force. However, in order to protect an electronic device from becoming damaged through contact with cylindrical members 114a and 114b when accessory device 100 is dropped while carrying the electronic device, accessory device 100 may include a non-metal part 116a and a non-metal part 116b. Non-metal parts 116a and part 116b can prevent metal-to-metal contact between an electronic device housing and cylindrical members 114a and 114b. Further, non-metal parts 116a and part 116b can be used as shock absorbers. Non-metal parts 116a and part 116b may be constructed from a material, or materials, including rubber, plastic(s), and/or fabric(s), as non-limiting examples.

In order to cover and hide certain internal features and components, accessory device 100 may include multiple covers. For instance, accessory device 100 includes a cover 118a located on section 102a, as well as a cover 118b located on section 102b (such that segments 106a and 106b are overlaid by cover 118b). Covers 118a and 118b generally cover one region (e.g., a front region) of accessory device 100. In this regard, accessory device 100 may further include a cover 118c that generally covers another region (e.g., a back region) of accessory device 100. In some embodiments, the aforementioned covers include silicone and/or fabric. In the embodiment shown in FIG. 1, the aforementioned covers include polypropylene terephthalate ("PTP") and thermoplastic polyurethane ("TPU") laminated together. The TPU layer may provide a structurally rigid layer, while the PTP layer provides an aesthetic exterior finish.

While the aforementioned covers substantially overlay regions of accessory device 100, these covers may include openings to accommodate certain features. For example, cover 118a includes openings for the keys of input mechanism 104a, as well as an opening for input mechanism 104b. Regarding the former, the openings of cover 118a may define a web passing through the keys of input mechanism 104a. Further, both input mechanisms 104a and 104b may be sub-flush, or below in elevation, with respect to cover 118a. Further, covers 118b and 118c generally do not cover opening 109.

Accessory device 100 may further include a weight 120a and a weight 120b. When an electronic device is secured with accessory device 100 at, for example, segment 106a, the center of mass of the system (i.e., accessory device 100 plus the electronic device) may render the system vulnerable to tipping or falling over. Moreover, a force provided by user interaction with the electronic device may also result in accessory device 100 tipping or falling over. However, weights 120a and 120b are designed to offset these effects caused by accessory device 100 carrying the electronic device. This will be further shown below.

Figure 2:
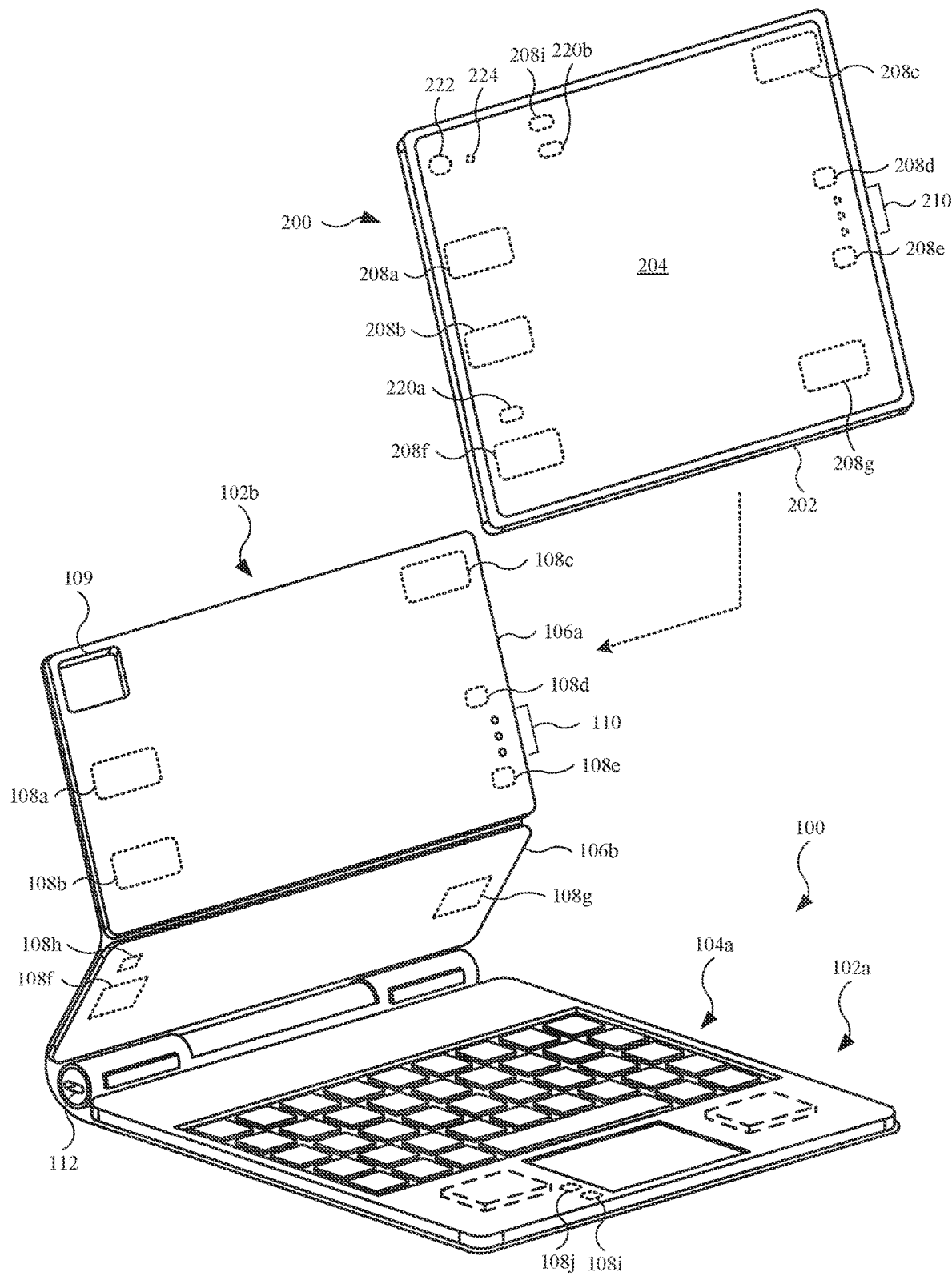
FIG. 2 illustrates an isometric view of the accessory device shown in FIG. 1, showing an electronic device that can be used with the accessory device.

FIG. 2 illustrates an isometric view of accessory device 100 shown in FIG. 1, showing an electronic device 200 that can be used with accessory device 100. Electronic device 200 may include a portable electronic device, such as a mobile wireless communication device (e.g., smartphone, tablet computing device). Electronic device 200 may include an enclosure 202, or housing, designed to carry several components (not shown), such as processing circuitry (e.g., central processing unit, graphics processing unit, application-specific integrated circuits), memory circuitry, batteries, audio speakers, microphones, and flexible circuitry to electrical couple the components together, as non-limiting examples. Electronic device 200 may further include a display assembly 204 coupled with enclosure 202. Display assembly 204 may include a touch input display.

Electronic device 200 may further include magnets designed to magnetically couple with magnets in accessory device 100. For example, electronic device 200 includes magnets 208a, magnets 208b, magnets 208c, magnets 208d, and magnets 208e designed to magnetically couple with the magnets 108a, 108b, 108c, 108d, and 108e, respectively, located in segment 106a. Additionally, electronic device 200 includes magnets 208f and magnets 208g designed to magnetically couple with magnets 108f and 108g, respectively, located in segment 106b. Further, electronic device 200 includes magnets 208i designed to magnetically couple with the magnets 108i located in section 102a. In the state of accessory device 100 shown in FIG. 2, magnets 208f, 208g, and 208i are not magnetically coupled with magnets 108f, 108g, and 108i, respectively. However, in other states (shown and described below), magnets 208f, 208g, and 208i are magnetically coupled with magnets 108f, 108g, and 108i, respectively. Also, similar to the magnets of accessory device 100, the magnets of electronic device 200 are represented by a rectangular perimeter that may represent several discrete magnetic elements, or a single magnetic element.

Electronic device 200 further includes electrical contacts 210 designed to electrically couple with electrical contacts 110 of accessory device 100, thereby placing electronic device 200 in communication with accessory device 100. Electronic device 200 further includes a sensor 220a and a sensor 220b. In some embodiments, sensors 220a and 220b each include a magnetic field sensor, such as a Hall Effect sensor (as a non-limiting example). Sensors 220a and 220b are designed to detect at least some of the magnets located in accessory device 100. For example, magnet 108h is positioned a location such sensor 220a may detect a magnetic field generated by magnet 108h, and magnet 108j is positioned a location such sensor 220b may detect a magnetic field generated by magnet 108j. In the state of the accessory device 100 shown in FIG. 2, the respective magnetic fields generated by magnets 108h and 108j are not detectable by the sensors 220a and 220b, respectively. However, in other states (shown and described below), the respective magnetic fields generated by magnets 108h and 108j are detectable by sensors 220a and 220b, respectively.

Electronic device 200 may include a camera assembly 222 and a flash module 224. Opening 109 in accessory device 100 is sized and positioned such that camera assembly 222 and the flash module 224 are unobstructed by segment 106a.

Figure 3:
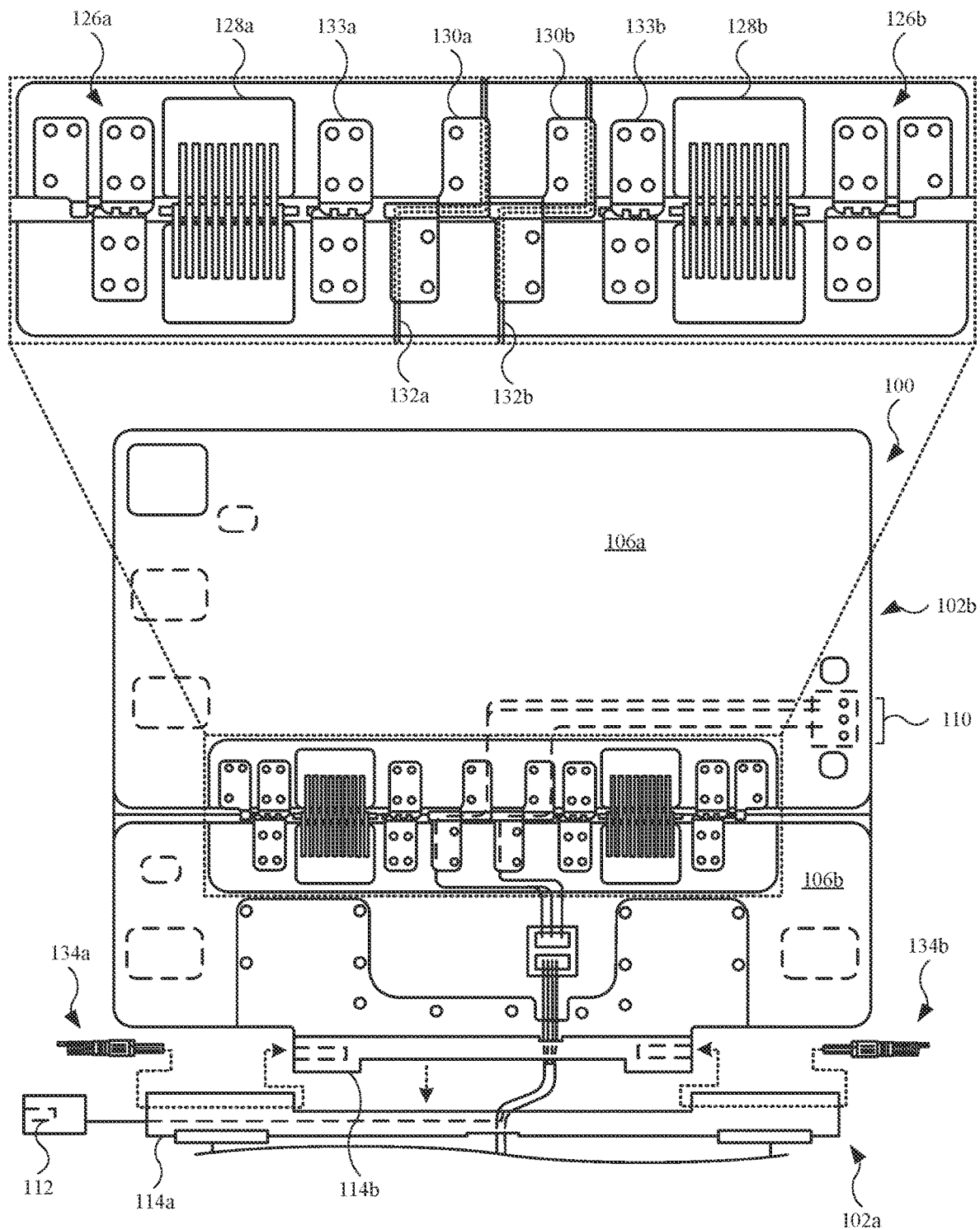
FIG. 3 illustrates a plan view of the accessory device shown in FIG. 1, showing various components of the section.

FIG. 3 illustrates a plan view of accessory device 100 shown in FIG. 1, showing various components of section 102b. For purposes of illustration, the cover 118b (shown in FIG. 1) is removed. A number of hinges are coupled with segments 106a and 106b of section 102b. For example, as shown in the enlarged view, section 102b includes a hinge 126a and a hinge 126b. While hinges 126a and 126b allow for some relative rotational movement of segments 106a and 106b, hinges 126a and 126b can also limit or control the movement of segment 106a relative to the segment 106b. For instance, segment 106a can rotate relative to segment 106b to a predetermined angle that is based upon the configuration and construction of hinges 126a and 126b. Accordingly, each of hinges 126a and 126b may be referred to as a stop hinge.

Section 102b further includes a hinge 128a and a hinge 128b. Hinges 128a and 128b may include several friction elements (shown, not labeled) that are frictionally engaged with each other. In this manner, frictional forces provided by hinges 128a and 128b can maintain a fixed position, initially, of segment 106a relative to segment 106b. However, once a rotational force is applied to segment 106a that overcomes the frictional forces provided by hinges 128a and 128b, segment 106a can rotate relative to segment 106b, provided the predetermined angle, based on hinges 126a and 126b, between segments 106a and 106b is not yet achieved. Further, once the applied force falls below the frictional forces provided by hinges 128a and 128b, segment 106a remains in a subsequent fixed position relative to segment 106b. Accordingly, each of hinges 128a and 128b may be referred to as a friction hinge. Further details regarding hinges 128a and hinge 128b, and their respective friction elements, may be found in, for example, in U.S. patent application Ser. No. 16/041,633, entitled HINGE ASSEMBLY WITH LAYERED FRICTION ELEMENTS, which is incorporated by reference in its entirety herein. Also, the functions and features of hinges 126a and 126b, as well as hinges 128a and 128b, will be further shown and described below.

Section 102b further includes a hinge 130a and a hinge 130b. In additional to promote rotational movement between segments 106a and 106b, hinges 130a and 130b also define a conduit for wiring. As shown, a wire 132a and a wire 132b (each representing one or more wires) pass through hinges 130a and 130b, respectively, including a respective barrel of hinges 130a and hinge 130a. Wires 132a and 132b are used to electrically couple electrical contacts 110 with port 112. Additionally, wires 132a and 132b can also be used to electrically couple electrical contacts 110 with input mechanisms 104a and 104b (both shown in FIG. 1). Section 102b further includes a hinge 133a and a hinge 133b, each of which may assist/promote rotation of segment 106a relative to segment 106b.

In order to rotationally couple section 102a with section 102b, accessory device 100 further includes hinge assemblies. For example, accessory device 100 includes a hinge assembly 134a and a hinge assembly 134b. Hinge assemblies 134a and 134b each connect to cylindrical members 114a and 114b. Further details of hinge assemblies 134a and 134b will be discussed below.

Figure 4:
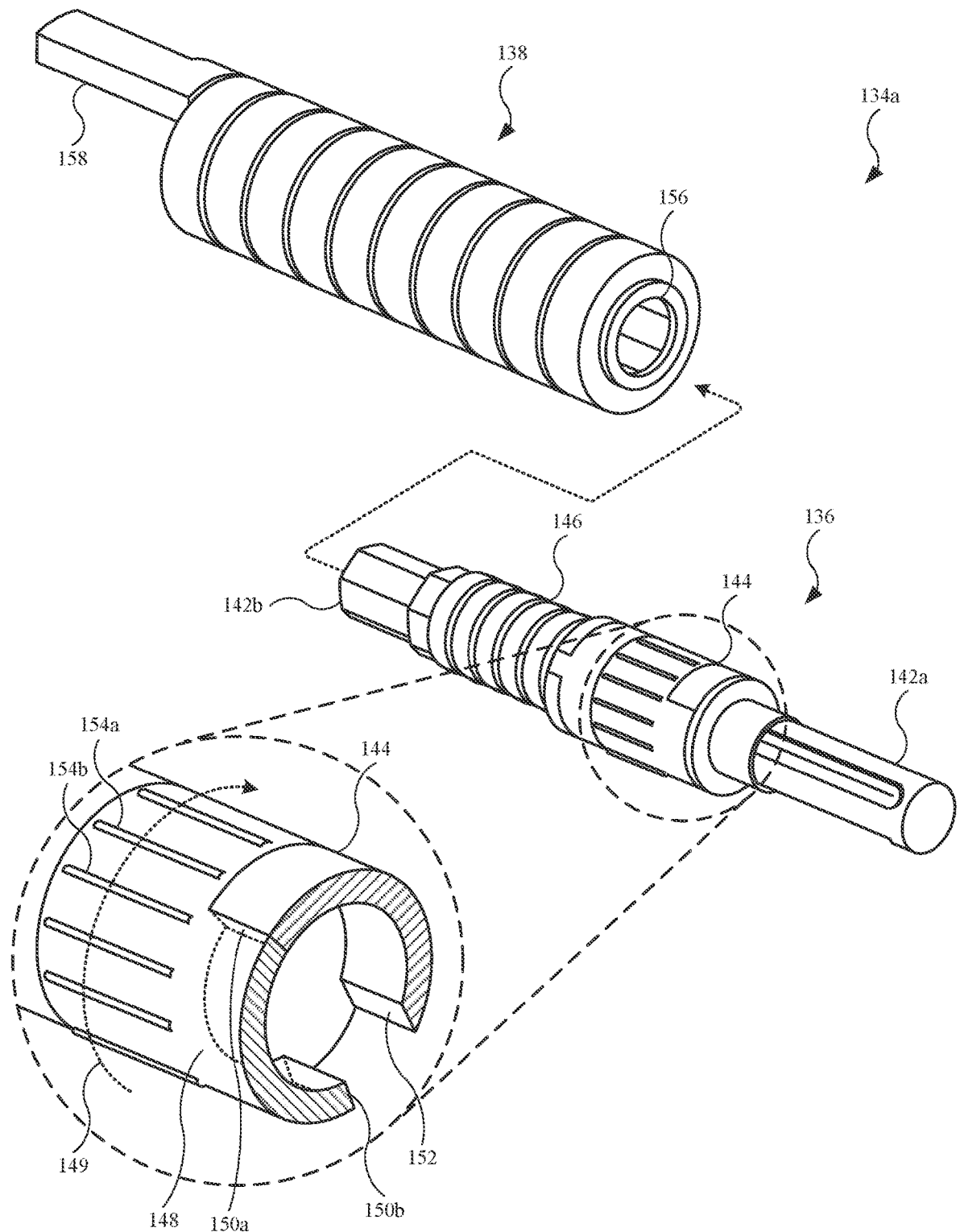
FIG. 4 illustrates an exploded view of the hinge assembly shown in FIG. 3.

FIG. 4 illustrates an exploded view of hinge assembly 134a shown in FIG. 3. As shown, hinge assembly 134a includes a clutch mechanism 136 and a spring mechanism 138. Clutch mechanism 136, or simply clutch, includes a shaft 142a designed to engage cylindrical member 114b (shown in FIG. 3). Clutch mechanism 136 further includes a rotational mechanism 144 coupled to shaft 142a. As shown in the enlarged view, rotational mechanism 144 is engaged with a part 148, and in particular, a surface 150a of the part 148. In response to the rotation of section 102b relative to section 102a (both shown in FIG. 1), rotational mechanism 144 can rotate (along with shaft 142a) relative to the part 148 in a direction indicated by an arrow 149. Rotational mechanism 144 can continue to rotate until surface 152 of rotational mechanism 144 engages surface 150b of part 148. When surfaces 152 and 150b engage each other, further rotation of rotational mechanism 144 is prevented and section 102b is also prevented from further rotational movement relative to section 102a. However, rotational mechanism 144 can rotate in the opposite direction (i.e., a direction opposite arrow 149) until rotational mechanism 144 again engages surface 150a, thereby preventing rotation of section 102b relative to section 102a in the opposite direction. Accordingly, clutch mechanism 136 can provide a stop mechanism for limiting movement of section 102b relative to section 102a in two different directions. This will be further discussed below.

Clutch mechanism 136 further includes a friction mechanism 146 frictionally engaged with shaft 142a. The frictional engagement between friction mechanism 146 and shaft 142a can provide a frictional force sufficient to maintain a fixed position between sections 102a and 102b, even in instances when rotational mechanism 144 is not engaged with either of surfaces 150a and 150b of part 148. Accordingly, clutch mechanism 136 provides a friction force to maintain section 102b in a fixed position relative to section 102a, such as the position shown in FIG. 1. Further, clutch mechanism 136 may include several detents located on a perimeter of part 148. For example, clutch mechanism 136 includes a detent 154a and a detent 154b (representative of additional detents) located on the outer surface of part 148. Detents 154a and 154b can provide the user with an indication of rotational movement while the user is rotating section 102b relative to section 102a, and in particular, when accessory device 100 (shown in FIG. 1) transitions from a closed state to an open state, or vice versa. The open and closed states will be shown and described below.

Clutch mechanism 136 further includes a shaft 142b. In some embodiments, shafts 142a and 142b define a unitary (i.e., single-piece or monolithic) shaft. Accordingly, in these embodiments, shafts 142a and 142b represent opposing ends of a single shaft. In other embodiments, shafts 142a and 142b are separate bodies.

Spring mechanism 138 is designed to counterbalance the weight of electronic device 200 (shown in FIG. 2) when electronic device 200 is magnetically coupled to section 102b. In this regard, spring mechanism 138 can prevent section 102b from rotating and collapsing due to the weight of electronic device 200. Accordingly, the spring constant of spring mechanism 138 can be selected based upon the weight of electronic device 200 and section 102b. In order to couple with clutch mechanism 136, spring mechanism 138 includes an opening 156 that receives shaft 142b. Spring mechanism 138 further includes a spring end 158 designed to couple with cylindrical member 114a (shown in FIG. 3).

As an example, rotation of section 102b relative to section 102a (both shown in FIG. 1) causes rotation of shaft 142a.

The rotation of shaft 142a causes a corresponding rotation of the rotational mechanism 144. The rotation of rotational mechanism 144 causes a corresponding rotation of shaft 142b, which provides a rotational force to spring mechanism 138. The rotation of components may continue until rotational mechanism 144 engages a surface of the part 148 (i.e., surface 150a or surface 150b). Also, friction mechanism 146 provides frictional engagement with (at least) shaft 142a, and accordingly, section 102b can remain in a fixed position relative to the section 102a when rotation ceases. Hinge assembly 134b (shown in FIG. 3) may include any components and features shown and described for hinge assembly 134a.

Figure 5:
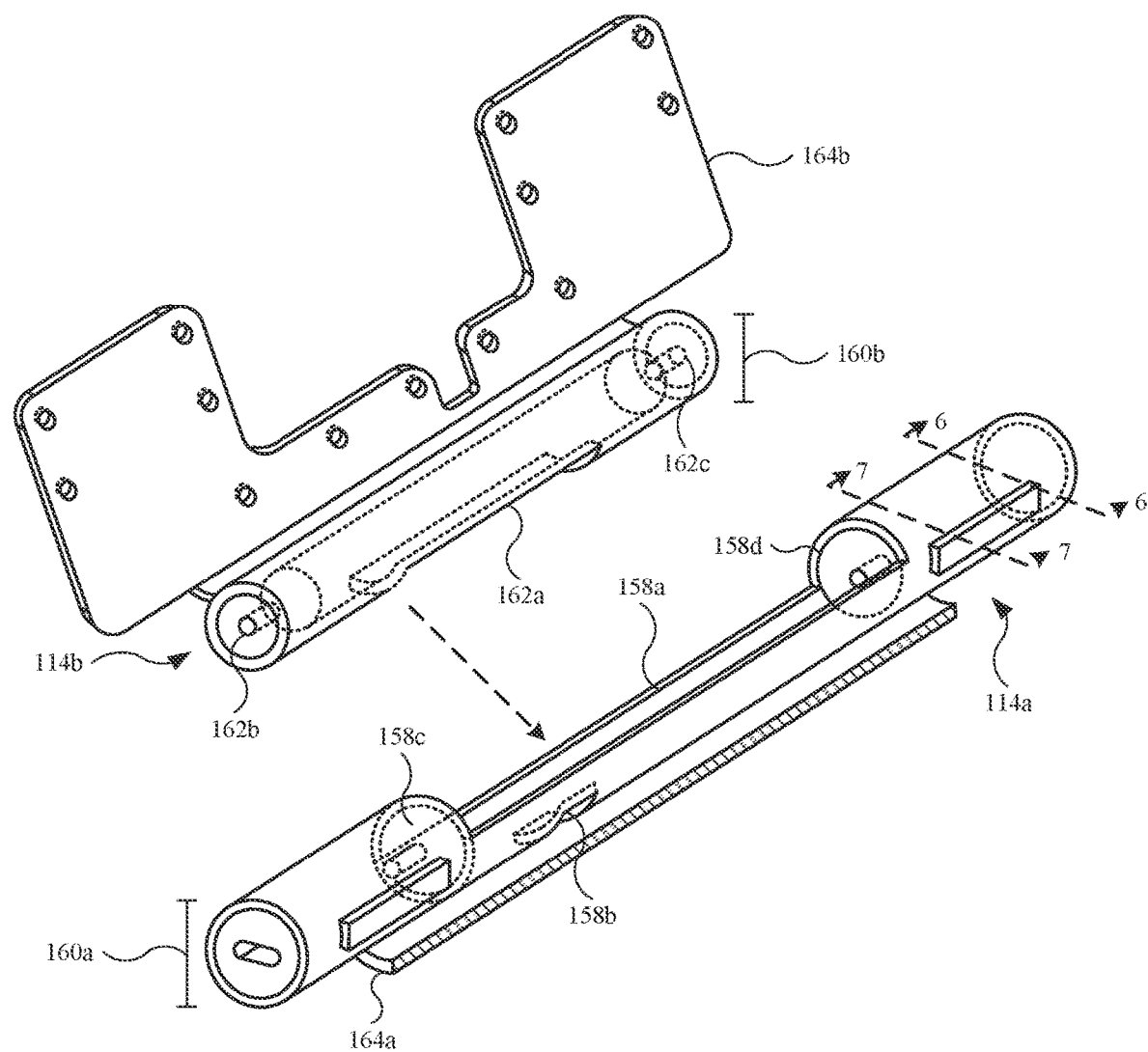
FIG. 5 illustrates an isometric view of the cylindrical members shown in FIG. 3.

FIG. 5 illustrates an isometric view of cylindrical members 114a and 114b. As shown, cylindrical member 114a includes an opening 158a on a rounded surface, or curved surface, of cylindrical member 114a. Additionally, cylindrical member 114a includes a diameter 160a, and cylindrical member 114b includes a diameter 160b that is less than diameter 160a. Based upon opening 158a of cylindrical member 114a and the respective diameters of cylindrical members 114a and 114b, cylindrical member 114b can fit into cylindrical member 114a. Also, cylindrical members 114a and 114b may be referred to as an outer cylindrical member and an inner cylindrical member, respectively, based on their respective positional relationship.

Cylindrical member 114a, along with cylindrical member 114b, may include additional openings. For example, cylindrical member 114a includes an opening 158b and cylindrical member 114b includes an opening 162a. Openings 162a and 158b permit wiring, such as wires 132a and 132b (shown in FIG. 3), to pass through cylindrical members 114b and 114a, respectively. Cylindrical members 114a and 114b include an opening 158c and an opening 162b, respectively, designed to receive a portion of hinge assembly 134a (shown in FIG. 3). Also, cylindrical members 114a and 114b include an opening 158d and an opening 162c, respectively, designed to receive a portion of hinge assembly 134b (shown in FIG. 3).

As shown, cylindrical members 114a and 114b are connected to a plate 164a (partially shown) and a plate 164b, respectively. Plates 164a and 164b may be connected to sections 102a and 102b (both shown in FIG. 1), respectively. When cylindrical members 114a and 114b are assembled with hinge assemblies 134a and 134b (shown in FIG. 3), cylindrical members 114a and 114b can define a hinge assembly for rotationally driving section 102b with respect to section 102a.

Figure 6:
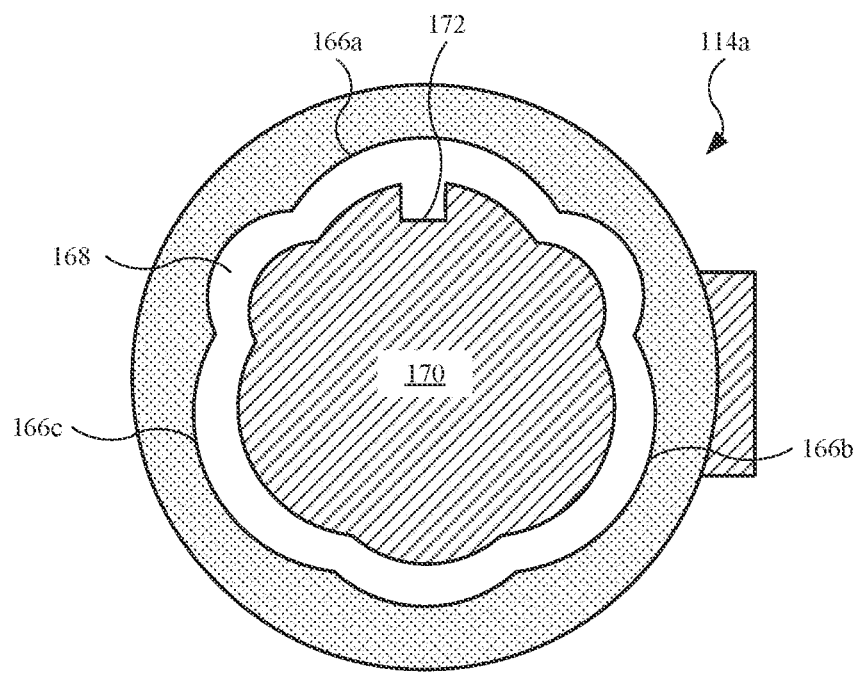
FIG. 6 illustrates a cross sectional view of the cylindrical member shown in FIG. 5, taken along line 6-6.

FIG. 6 illustrates a cross sectional view of cylindrical member 114a shown in FIG. 5, taken along line 6-6. As shown, cylindrical member 114a includes a lobe 166a, a lobe 166b, and a lobe 166c. Each of lobes 166a, 166b, and 166c define an undercut in cylindrical member 114a. Cylindrical member 114a is designed to fit a spring mechanism (similar to spring mechanism 138 shown in FIG. 3) into an opening 168 defined in part by lobes 166a, 166b, and 166c. Further, cylindrical member 114a can receive a part 170 designed to couple with the aforementioned spring mechanism. Part 170 includes a recess 172 that receives a spring end (similar to spring end 158 shown in FIG. 3).

Figure 7:
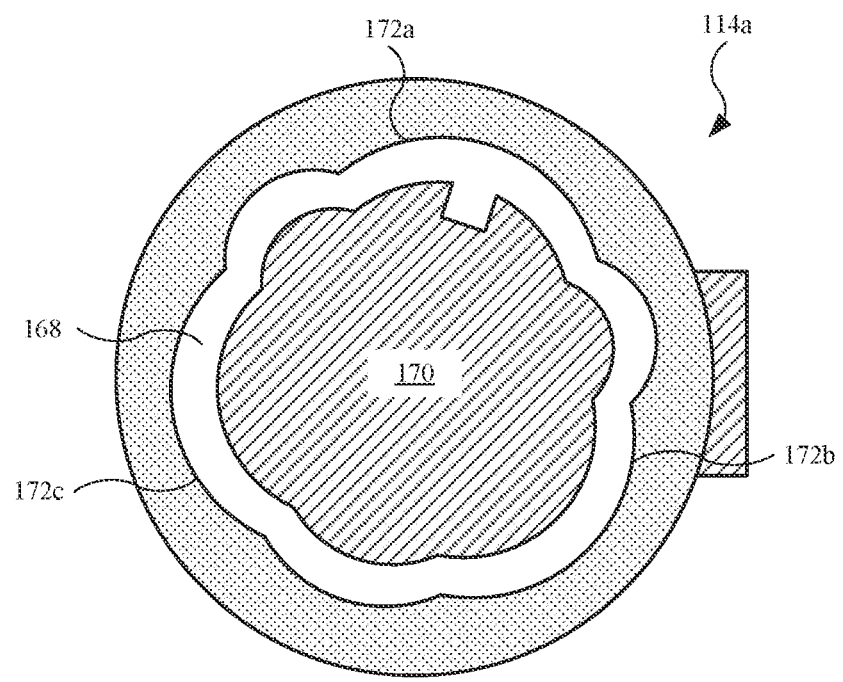
FIG. 7 illustrates a cross sectional view of the cylindrical member shown in FIG. 5, taken along line 7-7.

Part 170 can be used to rotate, and thus preload, the spring mechanism and drive the spring mechanism further into opening 168 of the cylindrical member 114a. For example, FIG. 7 illustrates a cross sectional view of cylindrical member 114a shown in FIG. 5, taken along line 7-7. FIG. 7 represents a different location of opening 168, as compared to the location of opening 168 shown in FIG. 6. For example, at the location of opening 168 shown in FIG. 7, cylindrical member 114a includes a lobe 172a, a lobe 172b, and a lobe 172c, similar to lobes 166a, 166b, and 166c (each shown in FIG. 6), respectively. However, lobes 172a, 172b, and 172c are offset an angle with respect to lobes 166a, 166b, and 166c, respectively. Once the spring mechanism is rotated, the spring mechanism is driven into opening 168 by part 170, where the spring member is surrounded by, and in some cases positioned against, the lobes 172a, 172b, and 172c.

FIGS. 8-13 show and describe various states of accessory device 100, and associated relationships with electronic device 200 based upon the state of accessory device 100.

Figure 8:
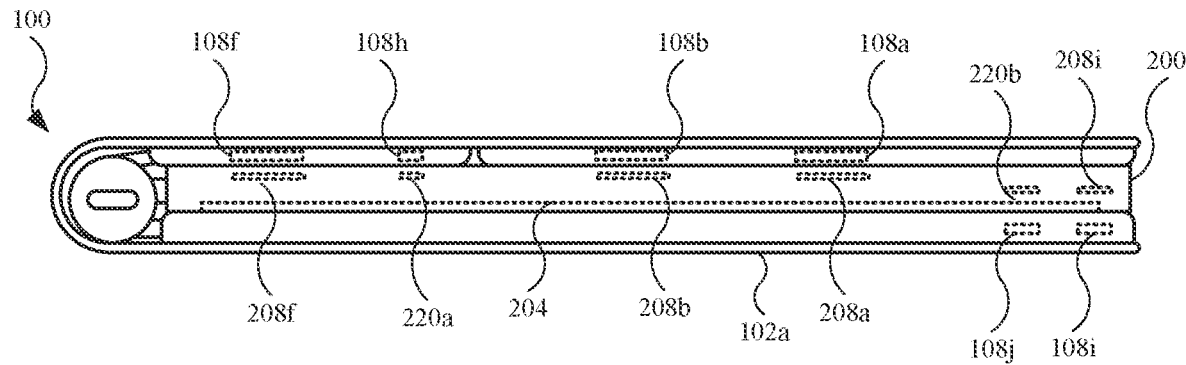
FIG. 8 illustrates a side view of the accessory device and the electronic device, showing the accessory device in a closed state.

FIG. 8 illustrates a side view of accessory device 100 and electronic device 200, showing accessory device 100 in a closed state. As shown, accessory device 100 is wrapped around electronic device 200, thereby covering multiple surfaces of electronic device 200. Further, accessory device 100 is coupled with electronic device 200 by magnets. For example, magnets 108a, 108b, 108f, and 108i of accessory device 100 are magnetically coupled with magnets 208a, 208b, 208f, and 208i, respectively, of electronic device 200. Although not shown, additional magnetic couplings may also be present.

Also, in the closed state, sensors 220a and 220b can detect a magnetic field from magnets 108h and 108j, respectively, and provide a signal based upon detection of a magnetic field. Electronic device 200 can determine accessory device 100 is in the closed stated, based upon input signals received by sensors 220a and 220b indicating a detection of a respective magnetic field from magnets 108h and 108j, respectively. Electronic device 200 can thus determine display assembly 204 is covered by accessory device 100, and place display assembly 204 in an inactive state. In the inactive state, display assembly 204 is off.

Figure 9:
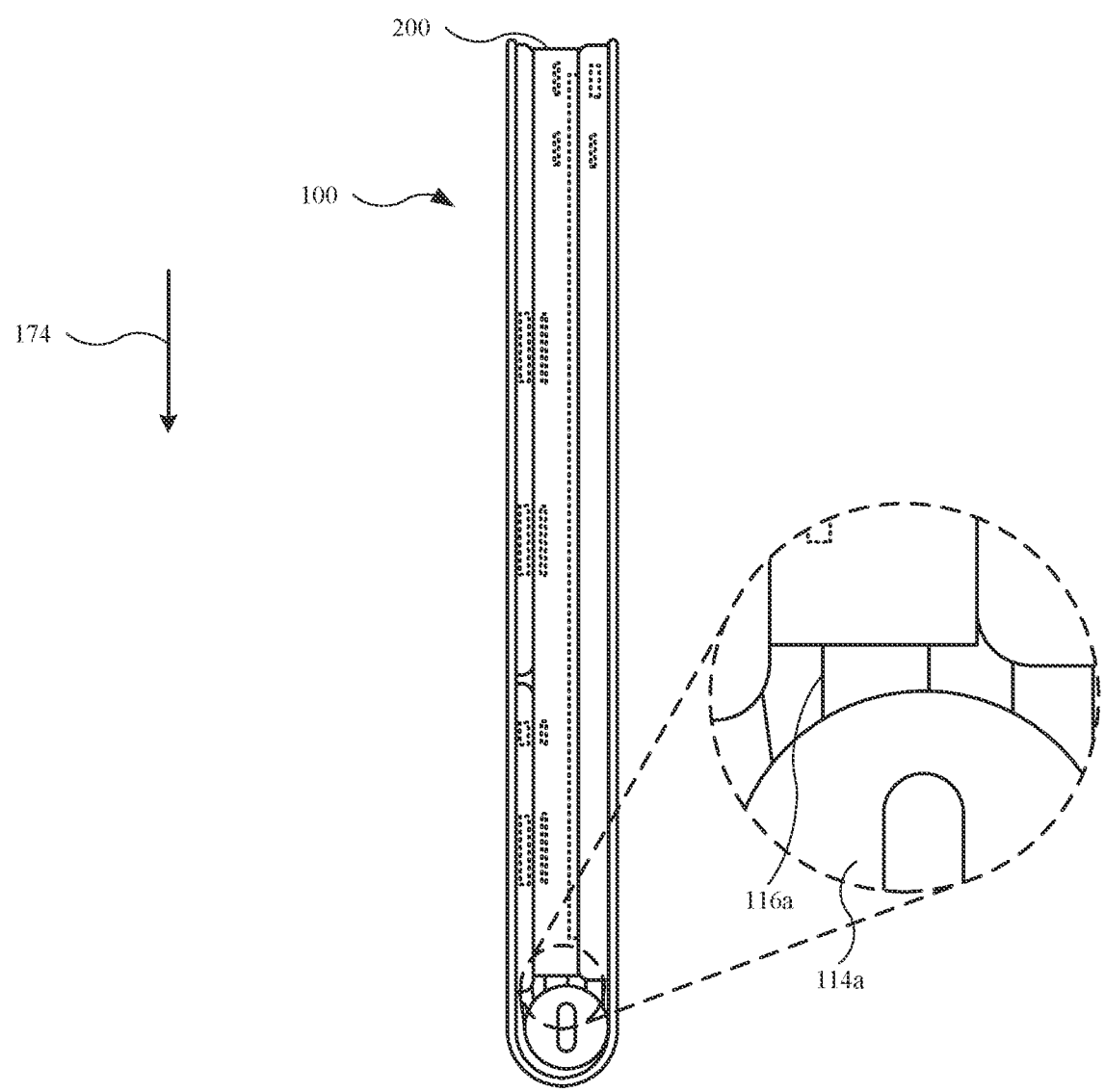
FIG. 9 illustrates a side view of the accessory device and the electronic device in an alternate orientation, showing the accessory device in the closed state.

FIG. 9 illustrates a side view of accessory device 100 and electronic device 200 in an alternate orientation, showing accessory device 100 in the closed state. Based upon the orientation of accessory device 100 and electronic device 200, a gravitational force is in the direction of an arrow 174. In the event the system (defined by accessory device 100 and electronic device 200) is dropped, non-metal part 116a is positioned between electronic device 200 and cylindrical member 114a. As a result, non-metal part 116a prevents a collision between electronic device 200 and cylindrical member 114a, thereby preventing damage to electronic device 200. Non-metal part 116b (shown in FIG. 1) is positioned in a manner similar to what is described for non-metal part 116a, and thus provides similar benefits as those of non-metal part 116a.

Figure 10:
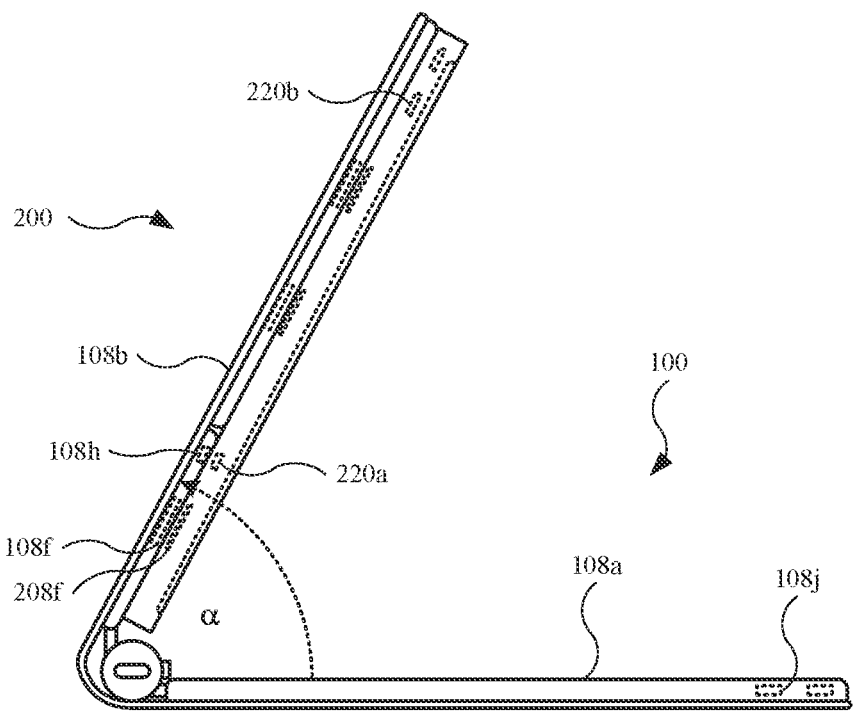
FIG. 10 illustrates a side view of the accessory device and the electronic device, showing the accessory device in a partially open state.

FIG. 10 illustrates a side view of accessory device 100 and electronic device 200, showing accessory device in a partially open state. In the partially open state, section 102b is rotated away from section 102a by an angle α. Angle α may represent a maximum angle between sections 102b and 102a, as hinge assemblies 134a and 134b (shown in FIG. 3) limit further rotational movement of section 102b away from section 102a. In particular, the relationship between rotational mechanism 144 and part 148 (shown in FIG. 3) can dictate/define the angle α.

Figure 11:
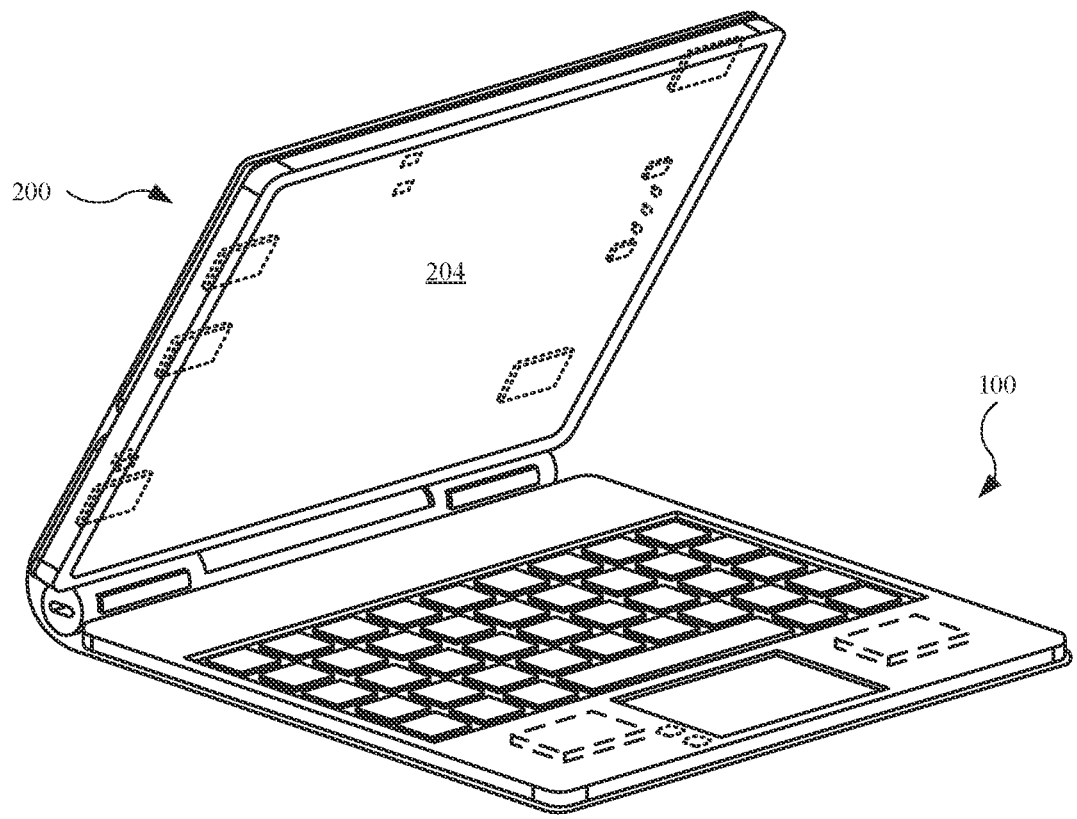
FIG. 11 illustrates an isometric view of the accessory device and the electronic device, showing the accessory device in the partially open state and the display assembly of the electronic device in the inactive state.

FIG. 11 illustrates an isometric view of accessory device 100 and electronic device 200, showing accessory device 100 in the partially open state and display assembly 204 of electronic device 200 in an inactive state. When accessory device 100 transitions from the closed state (shown in FIGS. 8 and 9) to the partially open state (shown in FIG. 11), display assembly 204 remains in the inactive state. In this regard, referring again to FIG. 10, in the partially open state, sensor 220b no longer detects the magnetic field from magnet 108j. However, sensor 220a can still detect the magnetic field from the magnet 108h. As a result, the display assembly 204 in the inactive state, as sensor 220a provides an input based on detection of a magnetic field from magnet 108h.

Figure 12:
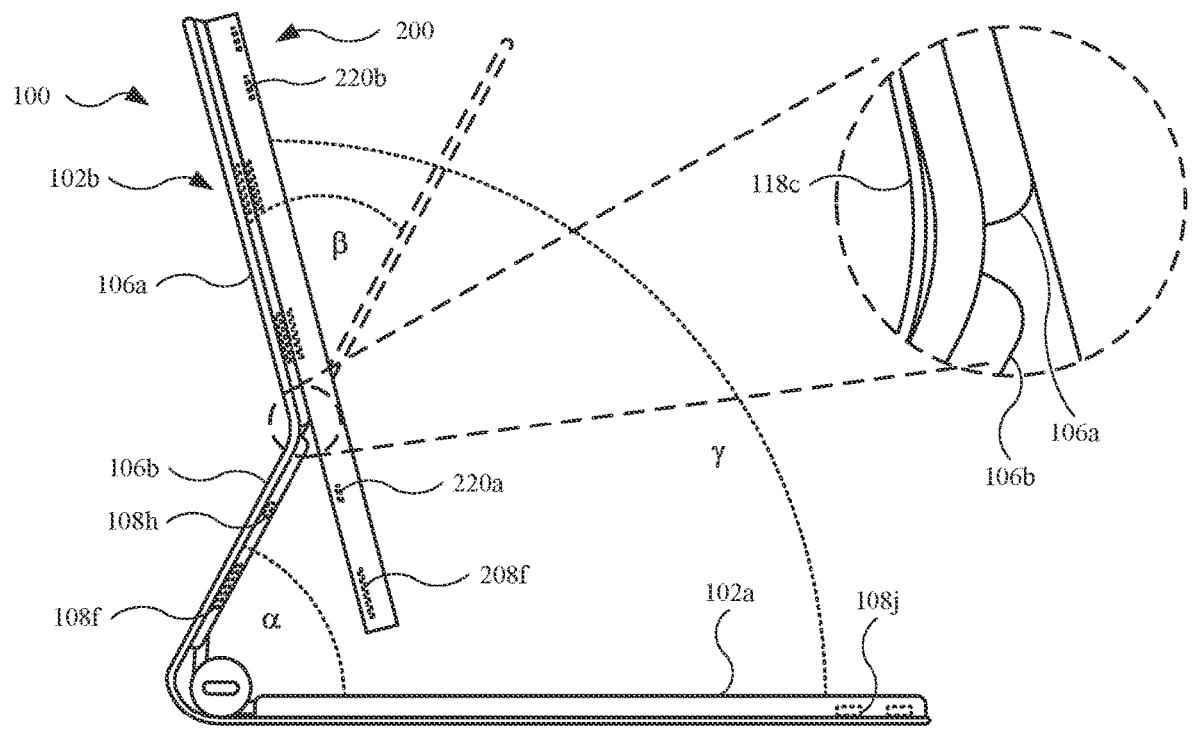
FIG. 12 illustrates a side view of the accessory device and the electronic device, showing the accessory device in an open state.

FIG. 12 illustrates a side view of accessory device 100 and electronic device 200, showing accessory device 100 in an open state. As shown, segment 106a is rotated from its original position in the partially open state (shown in FIG. 10) to an angle β in the open state. Angle β may represent a maximum angle of rotation by segment 106a, as hinges 126a and 126b (shown in FIG. 3) limit further rotational movement of segment 106a. Accordingly, the design and configuration of the hinges 126a and 126b can dictate/define angle β. Moreover, based upon the frictional forces provided by the hinges 128a and 128b (shown in FIG. 3), segment 106a can remain at a fixed position, i.e., at angle β. Still, based upon the frictional forces provided by hinges 128a and 128b, segment 106a can be rotated relative to segment 106b by some angle less than angle β, and remain in a fixed position at that angle (that is less than angle β).

Generally, accessory device 100 is designed such that section 102b is rotated to angle α prior to rotation of segment 106a. This is based in part upon the frictional forces provided by the hinges 128a and 128b, as well as hinge assemblies 134a and 134b (all shown in FIG. 3). Additionally, in the partially open state (shown in FIGS. 10 and 11), magnets 108f in accessory device 100 are still magnetically coupled with magnets 208f in electronic device 200. This resultant magnetic attraction maintains electronic device 200 against segments 106a and 106b, thereby preventing segment 106a from rotating. However, as shown in FIG. 12, when section 102a is separated from section 102b by angle α, an additional rotational force applied to segment 106a can overcome the magnetic attraction force between magnets 108f and 208f, causing segment 106a to rotate and electronic device 200 to decouple from segment 106b.

Further, when section 102b (in particular, segment 106b, as shown in FIG. 12) is separated from section 102a by angle α and segment 106a is rotated to angle β, electronic device 200 is separated from section 102a by an angle γ. Angle γ is the sum of angles α and β, and represents the maximum angle between section 102b (and in particular, between segment 106a) and section 102a. Put another way, angle γ represents the maximum angle between electronic device 200 and section 102a. Angle γ may be approximately in the range of 110 to 150 degrees. In some embodiments, angle γ is 135 degrees. Further, angle α may be approximately in the range of 40 to 80 degrees, and angle β may be approximately in range of 30 to 70 degrees, so long as the sum of angles α and angle β is at or within the given range for angle =.

Also, in the open state, electronic device 200 is no longer engaged with the segment 106b. In other words, electronic device 200 engaged only with segment 106a in the open state. While magnets 108f in accessory device 100 are no longer magnetically coupled with magnets 208f in electronic device 200, the magnetic couplings between the several magnets in accessory device 100 (i.e., the magnets in segment 106a) and the magnets in electronic device 200 can provide sufficient magnetic force to retain electronic device 200 against segment 106a. Moreover, the magnetic couplings between the magnets in accessory device 100 and electronic device 200 provide a sufficient magnetic force to suspend electronic device 200 over section 102a such that electronic device 200 is not in contact with section 102a, as shown in FIG. 12.

Also, as shown in the enlarged view, cover 118c is at least partially disengaged from segments 106a and 106b. In this location, cover 118c is not bonded (by adhesives, for example) with segments 106a and 106b. As a result, in the open state of accessory device 100, cover 118c is free to at least partially move away from segments 106a and 106b in order to avoid unwanted buckling, and to avoid unwanted counterforces by cover 118c that would otherwise counteract the hinges (shown in FIG. 3).

Figure 13:
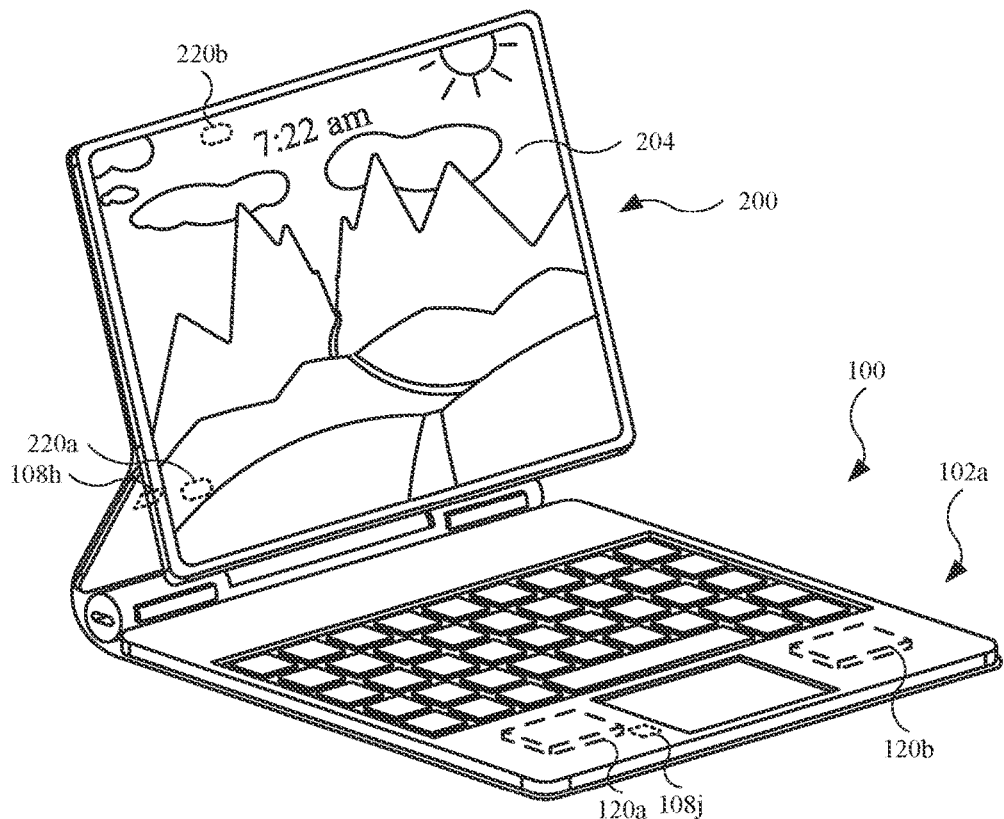
FIG. 13 illustrates an isometric view of the accessory device and the electronic device, showing the accessory device in the open state and the display assembly of the electronic device in an active state.

FIG. 13 illustrates an isometric view of accessory device 100 and electronic device 200, showing accessory device 100 in the open state and display assembly 204 of electronic device 200 in an active state. In the open state, sensors 220a and 220b no longer detect the magnetic field from the magnets 108h and 108j, respectively. As a result, electronic device 200, using input information from the sensor 220a and the sensor 220b (or lack thereof) indicating no detection of a magnetic field, can activate display assembly 204, i.e., turn on display assembly 204 as shown in FIG. 13.

Accordingly, when accessory device 100 transitions from the partially open state (shown in FIGS. 10 and 11) to the open state (shown in FIG. 13), electronic device 200 activates display assembly 204. Moreover, when accessory device 100 transitions from open state back to the partially open state, display assembly 204 can remain activated. However, when accessory device 100 transitions from the partially open state to the closed state (shown in FIGS. 8 and 9), electronic device 200 can deactivate display assembly 204 as sensors 220a and 220b detect magnets 108h and 108j, respectively, and provide input information to electronic device 200 indicating detection of a magnetic field. Also, weights 120a and 120b, located in section 102a of accessory device 100, may prevent the system (i.e., accessory device 100 plus electronic device 200) from tipping over due to the weight and position of electronic device 200, and/or due to user interaction with display assembly 204.

Figure 14:
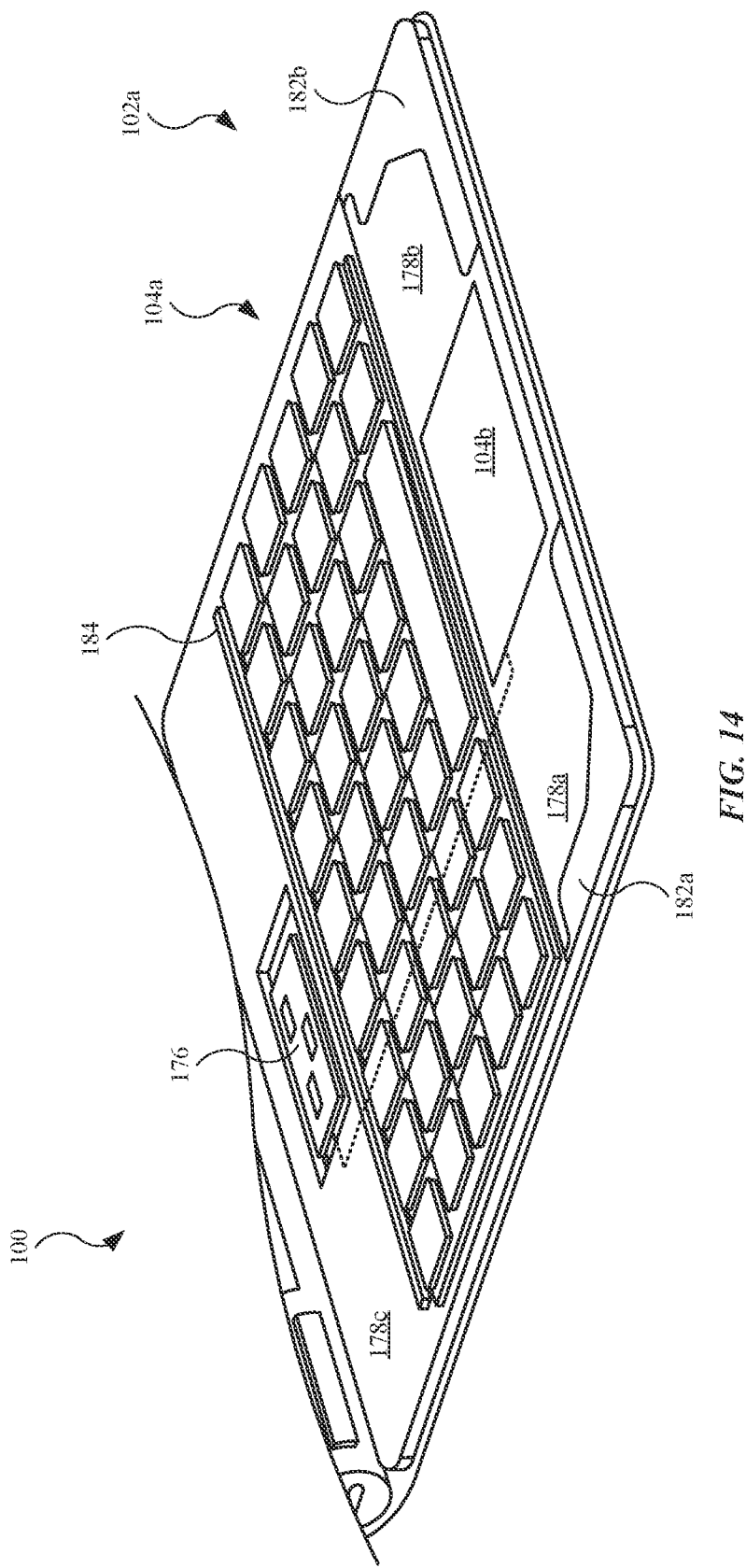
FIG. 14 illustrates an isometric view of the section, showing the cover removed from the section to reveal additional features.

FIG. 14 illustrates an isometric view of accessory device 100, showing cover 118a removed from section 102a to reveal additional features. As shown, accessory device 100 includes a circuit board 176. Several components, such as processing circuitry and memory circuitry, can be located on circuit board 176. Further, circuit board 176 may be electrically coupled to input mechanisms 104a and 104b by, for example, connectors and/or flexible circuitry (not shown in FIG. 14). Also, circuit board 176 is electrically coupled to electrical contacts 110 (shown in FIG. 1). Circuit board 176 is designed to communicate with the aforementioned components, as well as an electronic device (not shown in FIG. 14) coupled with accessory device 100.

In order to enhance the structural rigidity, section 102a may include a substantial amount of metal, such as aluminum. For example, section 102a includes a metal section 178a, a metal section 178b, and a metal section 178c. Also, input mechanism 104a may be backed by a metal plate (not shown in FIG. 14). While the overall structural rigidity may increase (as compared to the use of non-metals), the metals can impede or block radio frequency ("RF") signals intended to be transmitted and/or received by an electronic device (not shown in FIG. 14). For example, in the closed state of accessory device 100 (shown in FIG. 8), section 102a substantially covers one surface of electronic device 200, and the aforementioned metal is substantially close to electronic device 200.

In order to modify accessory device 100 to enhance/permit RF transmission, section 102a may include multiple non-metal sections. For example, as shown in FIG. 14, section 102a includes a non-metal section 182a and a non-metal section 182b. Non-metal sections 182a and 182b may be formed from a rigid plastic, as a non-limiting example, that generally does not block or impede RF transmission. The locations of non-metal sections 182a and 182b are selected based on corresponding locations of RF transmission components (e.g., antennae) in the electronic device, particularly when accessory device 100 retains electronic device 200 in the closed state (shown in FIG. 8).

Also, section 102a may include a light source 184 designed to transmit light toward input mechanism 104a. Light source 184 may include one or more light-emitting diodes ("LEDs"). When input mechanism 104a includes a keyboard with several keys, the keys may illuminate based upon light provided by light source 184. Also, in order to control light source 184, circuit board 176 is electrically coupled to light source 184. In this regard, circuit board 176 may include control circuitry to activate and deactivate light source 184.

Figure 15:
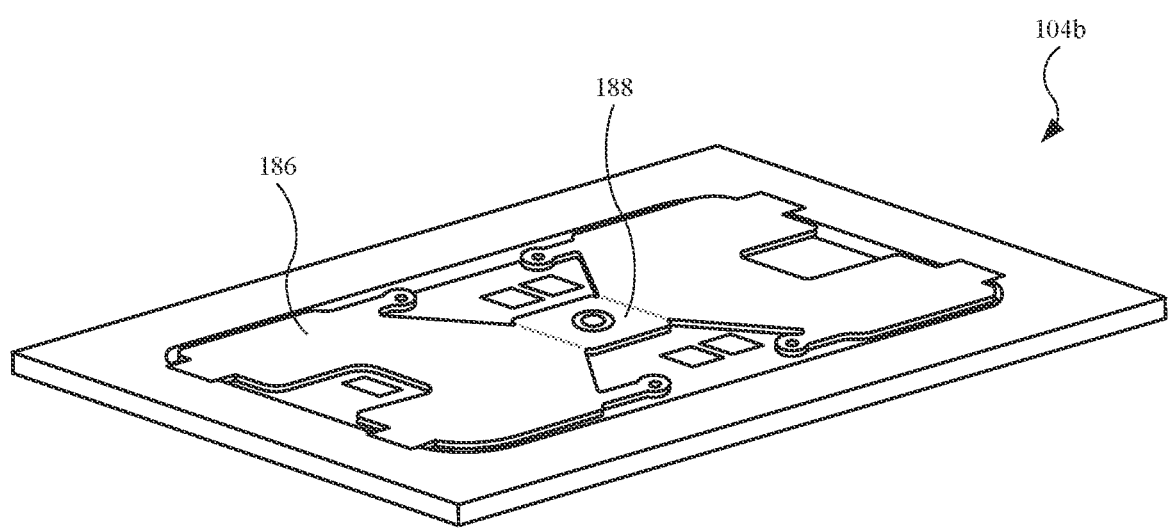
FIG. 15 illustrates an isometric view of the input mechanism, showing additional features of the input mechanism.

FIG. 15 illustrates an isometric view of input mechanism 104b, showing additional features of input mechanism 104b. An underside/bottom of input mechanism 104b is shown. Input mechanism 104b includes a plate 186 that covers a central location 188 of input mechanism 104b as well as each corner of input mechanism 104b. Using plate 186, a user can depress a user input surface (not shown in FIG. 15), i.e., touch surface of input mechanism 104b, generally at any location, and experience a "click" feel based on the depression. Also, the integration of plate 186 may provide input mechanism 104b with a relatively more compact and low-profile version, thereby allowing input mechanism 104b to be position sub-flush with respect to cover 118a (as shown in FIG. 1).

Figure 16:
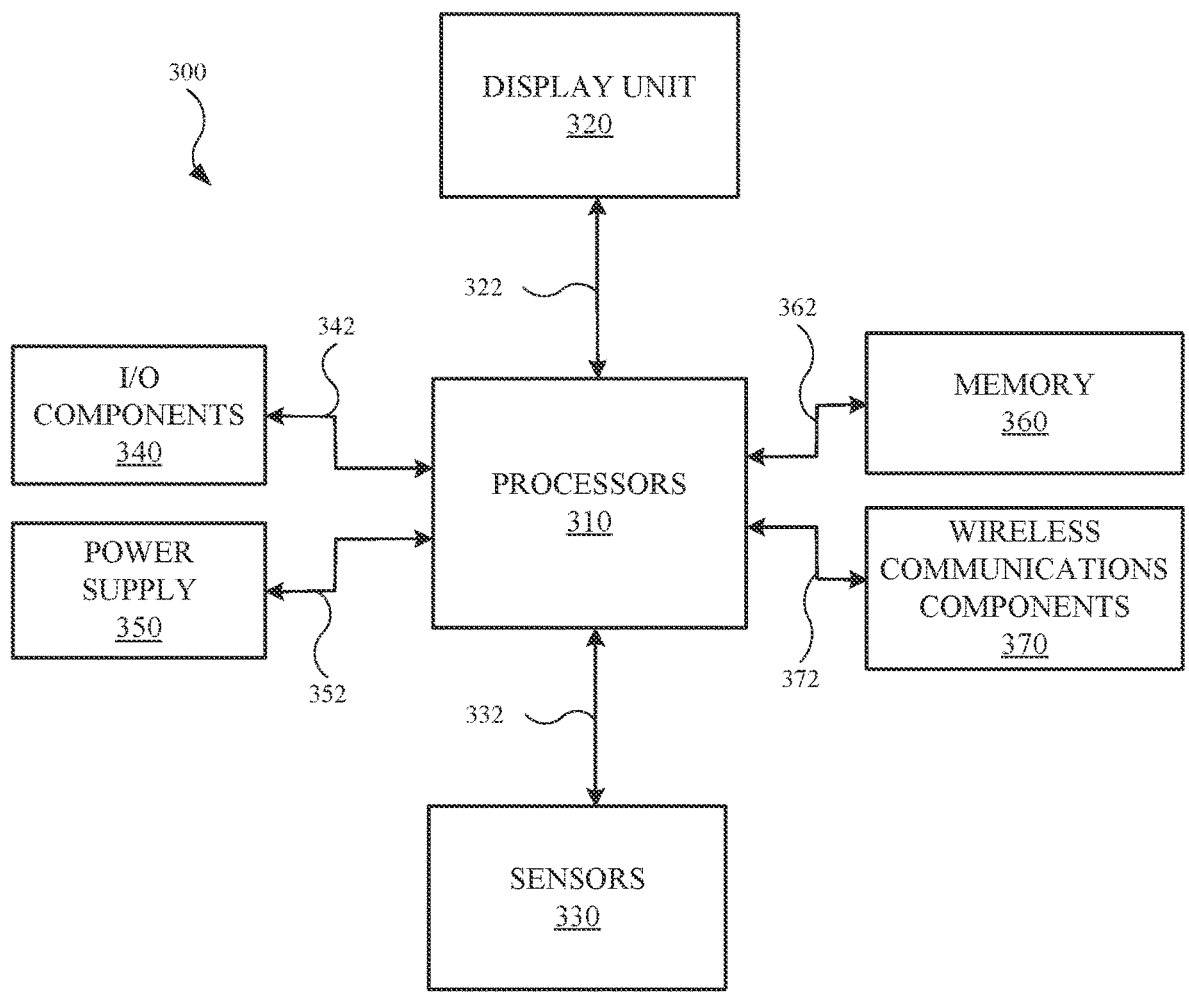
FIG. 16 illustrates a block diagram of an embodiment of an electronic device, in accordance with some described embodiments.

FIG. 16 illustrates a block diagram of an electronic device 300, in accordance with some described embodiments. The features in electronic device 300 may be present in other electronic devices described herein. Electronic device 300 may include one or more processors 310 for executing functions of electronic device 300. One or more processors 310 can refer to at least one of a central processing unit (CPU) and at least one microcontroller for performing dedicated functions. Also, one or more processors 310 can refer to application specific integrated circuits.

According to some embodiments, electronic device 300 can include a display unit 320. Display unit 320 is capable of presenting a user interface that includes icons (representing software applications), textual images, and/or motion images. In some examples, each icon can be associated with a respective function that can be executed by one or more processors 310. In some cases, display unit 320 includes a display layer (not illustrated), which can include a liquid-crystal display (LCD), light-emitting diode display (LED), or the like. According to some embodiments, display unit 320 includes a touch input detection component and/or a force detection component that can be configured to detect changes in an electrical parameter (e.g., electrical capacitance value) when the user's appendage (acting as a capacitor) comes into proximity with display unit 320 (or in contact with a transparent layer that covers display unit 320). Display unit 320 is connected to one or more processors 310 via one or more connection cables 322.

According to some embodiments, electronic device 300 can include one or more sensors 330 capable of provide an input to one or more processors 310 of electronic device 300. One or more sensors 330 may include magnetic field sensors, such as Hall Effect sensors, designed to detect magnetic fields from magnets in an accessory, and provide the detection information (or lack thereof) to one or more processors 310. In this manner, one or more processors 310 can determine a state of an accessory device described herein. One or more sensors 330 is/are connected to one or more processors 310 via one or more connection cables 332.

According to some embodiments, electronic device 300 can include one or more input/output components 340. In some cases, one or more input/output components 340 can refer to a button or a switch that is capable of actuation by the user. When one or more input/output components 340 are used, one or more input/output components 340 can generate an electrical signal that is provided to one or more processors 310 via one or more connection cables 342.

According to some embodiments, electronic device 300 can include a power supply 350 that is capable of providing energy to the operational components of electronic device 300. In some examples, power supply 350 can refer to a rechargeable battery. Power supply 350 can be connected to one or more processors 310 via one or more connection cables 352. Power supply 350 can be directly connected to other devices of electronic device 300, such as one or more input/output components 340. In some examples, electronic device 300 can receive power from another power sources (e.g., an external charging device) not shown in FIG. 16.

According to some embodiments, electronic device 300 can include memory 360, which can include a single disk or multiple disks (e.g., hard drives), and includes a storage management module that manages one or more partitions within memory 360. In some cases, memory 360 can include flash memory, semiconductor (solid state) memory or the like. Memory 360 can also include a Random Access Memory ("RAM") and a Read-Only Memory ("ROM"). The ROM can store programs, utilities or processes to be executed in a non-volatile manner. The RAM can provide volatile data storage, and stores instructions related to the operation of electronic device 300. In some embodiments, memory 360 refers to a non-transitory computer readable medium. One or more processors 310 can also be used to execute software applications. In some embodiments, a data bus 362 can facilitate data transfer between memory 360 and one or more processors 310.

According to some embodiments, electronic device 300 can include wireless communications components 370. A network/bus interface 372 can couple wireless communications components 370 to one or more processors 310. Wireless communications components 370 can communicate with other electronic devices via any number of wireless communication protocols, including at least one of a global network (e.g., the Internet), a wide area network, a local area network, a wireless personal area network (WPAN), or the like. In some examples, wireless communications components 370 can communicate using NFC protocol, BLUETOOTH® protocol, or WIFI® protocol.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An accessory device, comprising:
 a first section comprising a keyboard; and
 a second section coupled to the first section, the second section comprising:
  a first segment,
  a second segment rotationally coupled to the first segment and the first section, and
  a magnet embedded in the second segment, wherein:
   in response to the second segment engaging an electronic device, the magnet is detectable by a sensor of the electronic device, thereby causing a display of the electronic device be in an inactive state, and
   in response to the second segment disengaged from the electronic device, the magnet is not detectable by the sensor, thereby causing the display to be in an active state.

2. The accessory device of claim 1, further comprising electrical contacts positioned on the first segment, wherein the electrical contacts are configured to electrically couple to the electronic device.

3. The accessory device of claim 1, further comprising:
 a first cylindrical element coupled to the first section; and
 a second cylindrical element coupled to the second section, wherein the first cylindrical element is positioned in the second cylindrical element.

4. The accessory device of claim 1, wherein the first section comprises weights configured to offset the electronic device.

5. The accessory device of claim 4, further comprising a track pad positioned between the weights.

6. The accessory device of claim 1, wherein in the inactive state, the first segment and the second segment engage the electronic device.

7. The accessory device of claim 6, wherein in the inactive state, only the first segment engages the electronic device.

8. The accessory device of claim 1, wherein:
 the first section comprises:
  a track pad,
  a radio frequency (RF) transmissive section, and
  a metal section positioned between the track pad and the RF transmissive; and the second section is rotationally coupled to the first section, the second section comprising:
a first segment, and
a second segment coupled to the first segment.

9. The accessory device of claim 8, wherein in response to the second section covering the electronic device, the RF transmissive section permits RF transmission to the electronic device.

10. The accessory device of claim 8, wherein the second section is configured to suspend the electronic device over the first section such that the first section contact with the electronic device.

11. The accessory device of claim 10, wherein the first section comprises weights configured to offset the electronic device.

12. The accessory device of claim 11, wherein the track pad is positioned between the weights.

13. The accessory device of claim 8, further comprising:
a first cylindrical element coupled to the first section; and
a second cylindrical element coupled to the second section, wherein the first cylindrical element is positioned in the second cylindrical element.

14. The accessory device of claim 13, further comprising a plate extending from the first cylindrical element and into the first section.

15. An accessory device, comprising:
a first section, comprising:
a keyboard,
a first weight,
a second weight, and
a track pad positioned between the first weight and the second weight; and
a second section rotationally coupled to the first section, the second section comprising:
a first segment,
a second segment rotationally coupled to the first segment and the first section, and
a magnet embedded in the second segment, wherein:
in response to the second segment engaging an electronic device, the magnet is detectable by a sensor of the electronic device, thereby causing a display of the electronic device be in an inactive state, and
in response to the second segment disengaged from the electronic device, the magnet is not detectable by the sensor, thereby causing the display to be in an active state, wherein in response to the second section carrying the electronic device, the first weight and the second weight offset the second section carrying the electronic device.

16. The accessory device of claim 15, wherein the first weight and the second weight offset the electronic device while the second section suspends the electronic device over the first section.

17. The accessory device of claim 16, wherein the second section is configured to carry the electronic device such that the electronic device lacks contact with the first section.

18. The accessory device of claim 15, wherein the first section comprises:
a radio frequency (RF) transmissive section.

19. The accessory device of claim 15, further comprising:
a first cylindrical element coupled to the first section; and
a second cylindrical element coupled to the second section, wherein the first cylindrical element is positioned in the second cylindrical element.

20. The accessory device of claim 19, further comprising a plate extending from the first cylindrical element and into the first section.

* * * * *